United States Patent
Giangrasso

[11] Patent Number: 6,126,119
[45] Date of Patent: Oct. 3, 2000

[54] PIPE SUPPORT INSULATION HOLDER

[76] Inventor: Anthony Giangrasso, 124 New Paltz Rd., Highland, N.Y. 12528

[21] Appl. No.: 09/190,417

[22] Filed: Nov. 9, 1998

[51] Int. Cl.[7] .................................................. E21F 17/02
[52] U.S. Cl. ............................................ 248/58; 248/74.1
[58] Field of Search ................... 248/74.1, 74.3, 248/74.2, 62, 63, 68.1, 69, 65, 58, 59

[56] References Cited

U.S. PATENT DOCUMENTS

| | | |
|---|---|---|
| 479,384 | 7/1892 | Alapaw . |
| 590,094 | 9/1897 | Duncan . |
| 2,393,033 | 1/1946 | Ellinwood ........................ 248/74.3 X |
| 2,749,155 | 6/1956 | Kinghorn et al. . |
| 3,061,253 | 10/1962 | Keaton . |
| 3,244,388 | 4/1966 | Coffman ................................... 248/62 |
| 3,606,218 | 9/1971 | Enlund et al. ......................... 248/74.2 |
| 4,059,872 | 11/1977 | Delasandri . |
| 4,249,610 | 2/1981 | Loland . |
| 4,291,855 | 9/1981 | Schenkel et al. . |
| 4,478,381 | 10/1984 | Pittion et al. ...................... 248/74.1 X |
| 4,744,535 | 5/1988 | Patenaude ............................ 248/74.1 |
| 4,804,158 | 2/1989 | Collins et al. . |
| 4,934,645 | 6/1990 | Sherman ............................... 248/74.1 |
| 5,014,940 | 5/1991 | Sherman ............................... 248/74.1 |
| 5,113,717 | 5/1992 | Plamper . |
| 5,192,039 | 3/1993 | Williams ................................... 248/62 |
| 5,544,849 | 8/1996 | Peterson et al. . |

*Primary Examiner*—Ramon O. Ramirez
*Attorney, Agent, or Firm*—Joseph L. Spiegel

[57] ABSTRACT

A holder useful in the air conditioning and refrigeration fields for supporting or suspending an insulated pipe by means of a hanger includes a tubular P.V.C. shell for receiving the insulated pipe. The shell has an interior ribbed support for grasping the pipe with sidewalls through which the pipe passes and against which the insulation abuts. A hinge is molded lengthwise along the exterior of the shell. A lengthwise slit through the pipe support cooperates with the hinge whereby the holder may be opened like a clam shell to receive a pipe and the insulation. The holder is provided with a releasable clamp in the shell to lock the insulation in place and the support around the pipe. The shell is provided with an exterior circumferential recess for receipt of the hanger.

6 Claims, 3 Drawing Sheets

PIPE SUPPORT INSULATION HOLDER

BACKGROUND OF THE INVENTION

1. Field of the Invention

This invention is applicable in the field of air conditioning and refrigeration and in particular to a support for insulated pipes.

2. Description of the Prior Art

In air conditioning and refrigeration systems it is common to pass fluid through an iron or copper pipe which is covered with abutting tubular sections of insulation material. It is known that condensation and ice can form at the insulation seams. It is desirable to be able to support the insulated pipe securely so that condensation and ice will not form at the seams without breaking the insulation, yet still allowing free movement of the pipe when it expands.

In the past additional insulation has been wrapped around the support clamps to seal out the moisture.

Alapaw, U.S. Pat. No. 479,384 discloses a holder made in sections which jointly support a pipe.

Duncan, U.S. Pat. No. 590,094 describes a split tubular hose-clip with exterior circumferential recesses.

In Kinghorn et al, U.S. Pat. No. 2,749,155 a joint for aligned hollow tubular members is shown.

Keaton, U.S. Pat. No. 3,061,253 pertains to a clip for supporting conduit and in which the conduit may be locked in place within the conduit.

Delesandri, U.S. Pat. No. 4,059,872 discloses an assembly for gripping a hose and securing the hose to a cable. It requires fasteners to hold it to the hose.

Loland, U.S. Pat. No. 4,249,610 pertains to an offshore drilling control cable clamp system. It is an all steel construction welded and bolted around a cable with a rubber lined sleeve to grip the cable.

Schenkel et al, U.S. Pat. No. 4,291,855 discloses a pipe clamp comprising two clamp segments with ends having cooperating parts of a locking means for releasably connecting the clamp segments together.

The U.S. Pat. No. 4,804,158 to Collin et al, relates to an insulated pipe anchor apparatus that fits concentrically about a pipe and can be anchored to steel. Positive restraint is provided by interaction between an external frame and thrust plates with an internal structural insert.

Plamper, U.S. Pat. No. 5,113,717 describes an assembly that utilizes a two clamp system for a cable, one clamp to fasten the cable to a structure, the other to align the cable.

The U.S. Pat. No. 5,544,849 to Peterson et al, relates to a tubular wear sleeve for surrounding a fluid carrying tube subject to vibration. It utilizes an outer sleeve crimped around the tubing by means of internal ribs that are compressed into the tube restricting any movement. The arrangement does not allow for free movement from expansion nor limit vibration.

Prior art solutions have not kept moisture out completely and the areas around the support would have moisture or ice formed in the seams. This would cause damage to building structures, equipment and the pipe support.

SUMMARY OF THE INVENTION

An object of the invention is a holder particularly useful in air conditioning and refrigeration systems that use insulated pipes for holding the pipe securely while not breaking its insulation.

Another object is such a holder that seals the ends of the insulation to eliminate condensation leaks.

These and other objects, features and advantages of the present invention are accomplished in accordance with the teachings of the present invention, one illustrative embodiment of which comprises a holder useful in the air conditioning and refrigeration fields for supporting or suspending an insulated pipe by means of a hanger including a tubular C.V.C. shell for receiving the insulated pipe. The shell has an interior ribbed support for grasping the pipe with sidewalls through which the pipe passes and against which the insulation abuts. A hinge is molded lengthwise along the exterior of the shell. A lengthwise slit through the pipe support cooperates with the hinge whereby the holder may be opened like a clam shell to receive a pipe and the insulation. The holder is provided with a releasable clamp in the shell to lock the insulation in place and the support around the pipe. The shell is provided with an exterior circumferential recess for receipt of the hanger.

BRIEF DESCRIPTION OF THE DRAWING

Other objects features and advantages of the invention will be apparent from the following detailed description and accompanying drawing, wherein.

DETAILED DESCRIPTION

Figure 1A:
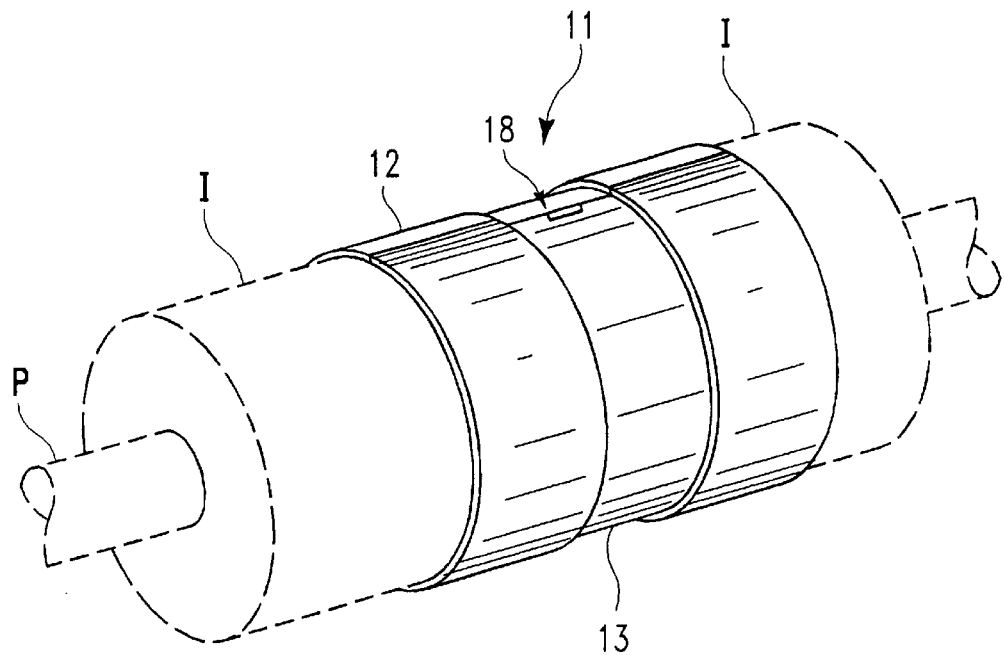
FIG. 1A is a perspective view of the novel holder of the present invention with pipe and insulation shown in phantom.
Figure 1B:
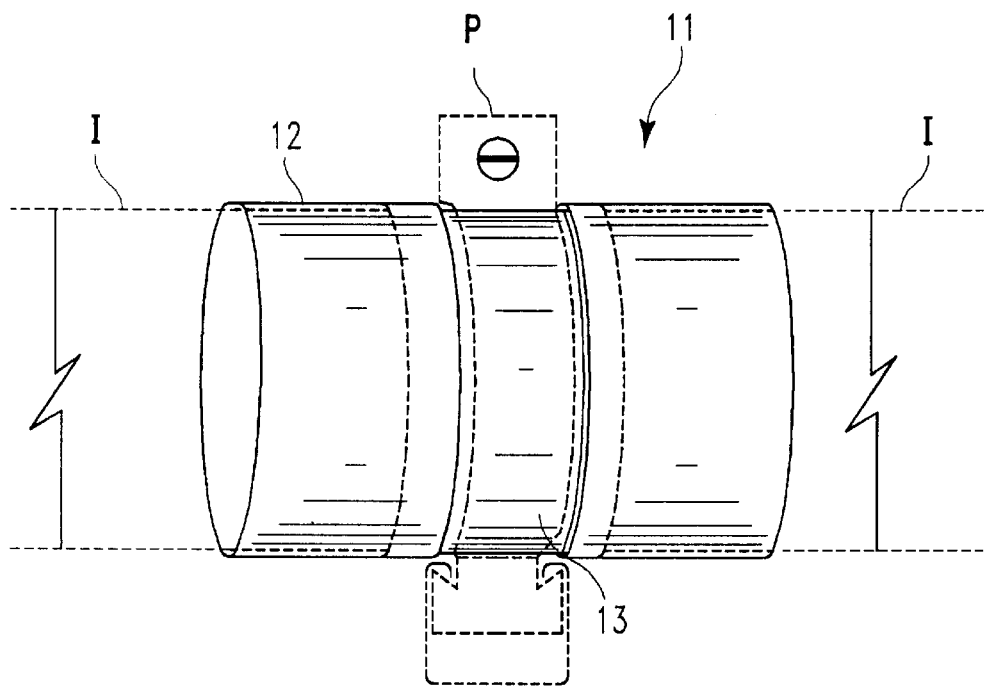
FIG. 1B is a perspective view of the novel holder with insulation shown in phantom and held within a typical strut clamp also shown in phantom.

Referring now to the drawing and first to FIG. 1a a holder 11 constructed of plastic such as P.V.C. plastic and in accordance with the teachings of the present invention is shown. Shown in phantom is a pipe P which could be copper, iron or plastic surrounded by sections of insulation I such as fiberglass or rubber. The holder 11 is seen as comprising a tubular shell 12 for receiving insulation I and pipe P. The exterior of shell 12 is provided with a recess 13 for receipt of a hanger such as the strut clamp S shown in FIG. 1B or the clevis hanger C shown in FIG. 2B.

The recess 13 in the shell interior which is completely about the periphery will self center the hanger, when the hanger is clamped in place.

Typically the recess 13 in the shell 12 is 1½ inches wide and ⅛ inch deep.

Figure 2A:
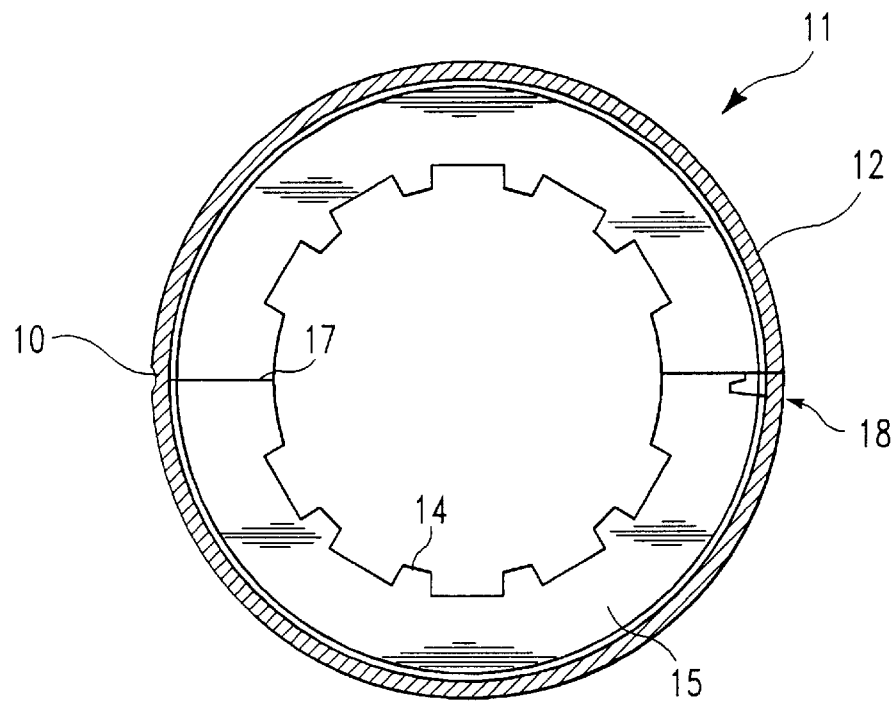
FIG. 2A is a cross sectional view through the interior ribbed pipe support of the holder.
Figure 2B:
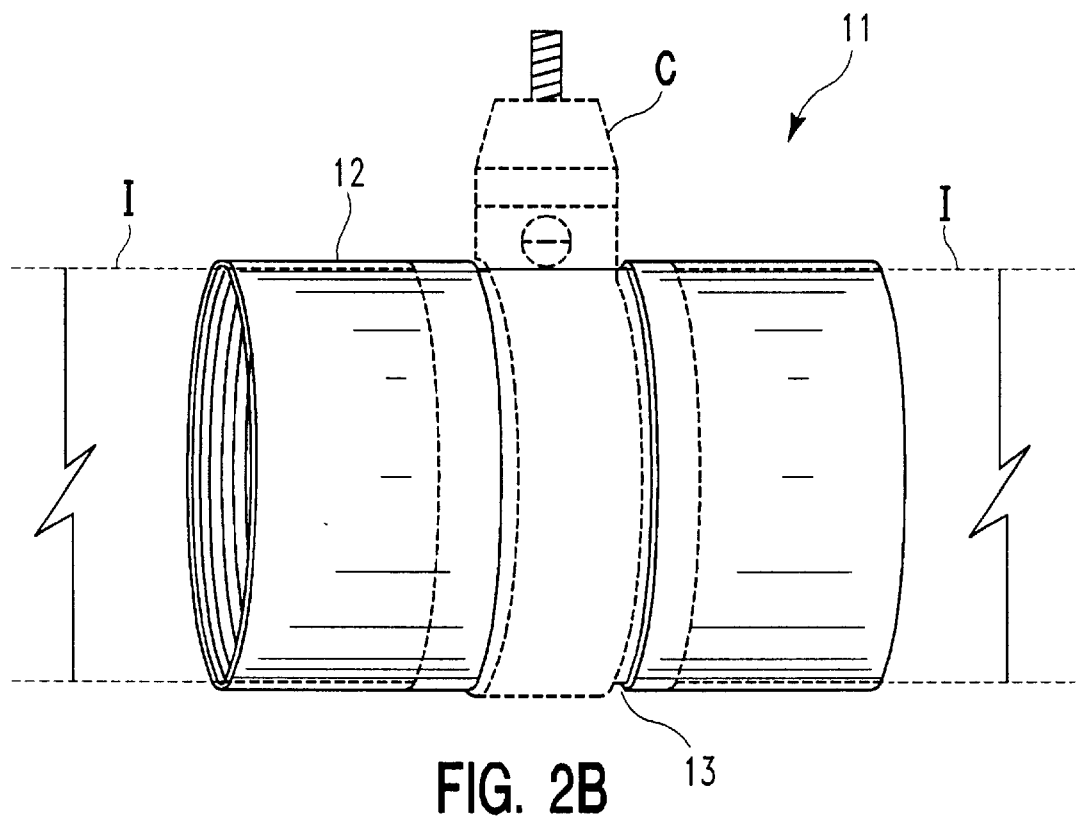
FIG. 2B is a perspective view of the novel holder with insulation shown in phantom and held within a clevis hanger, also shown in phantom; and, FIG. 3 is a perspective view of the ribbed pipe support section only of the holder—tubular shell.
Figure 3:
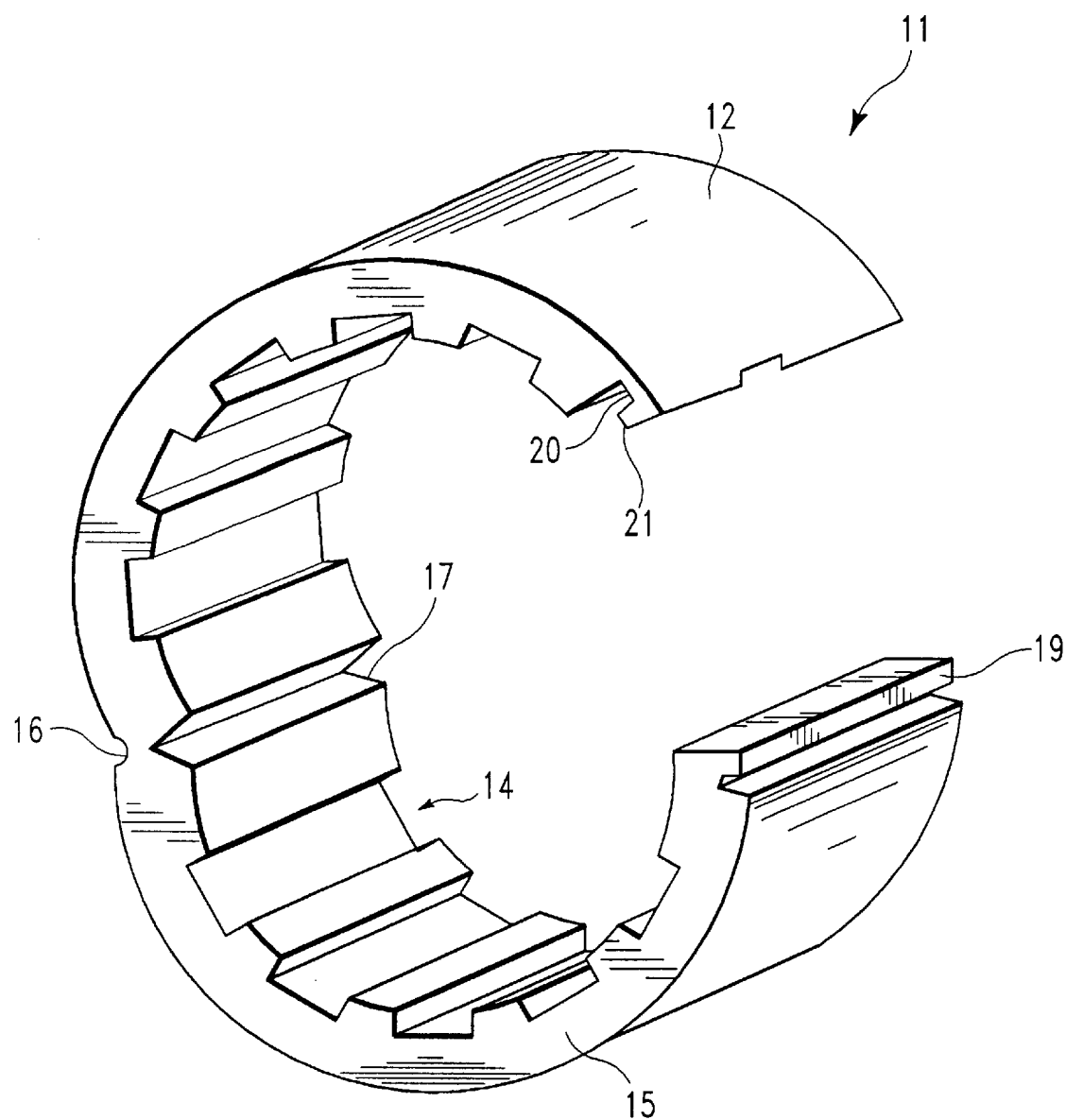

As best shown in FIGS. 2A and 3 the interior of the holder 11 is provided with a pipe support 14 centered within shell 12.

The interior pipe support 14 is seen as being ribbed so a lot of surface area is not placed onto and around the pipe P. In this way the pipe P isn't clamped too hard and movement due to thermal expansion is allowed for. Also the pipe P easily passes through the holder 11 without binding. Preferably the indentations between ribs are of rectangular cross section for ease of moldings.

The pipe support 14 is provided with transverse sidewalls 15 against which the insulation I will abut when fitted within the shell 12.

The holder 11 is provided with a longitudinal hinge 16 molded into the exterior of the shell 12 and a lengthwise slit 17 through the ribbed support 14. The holder 11 thus is seen as being one piece that will open up like a clam shell. In this way one does not have to worry about the holder 11 falling apart in two pieces, as, for example, when trying to climb a ladder.

The holder includes a releasable clamp 18 molded into the shell 12. The clamp 18 comprises a male 19 and female 20 member and a slotted release tab 21. When the pipe is laid through the holder 11 with the insulation I butted up against the support sidewalls 15, the clamp 18 locks pipe P and insulation I in place. The release tab 21 allows one to pop the holder 11 off again if one wants to reposition the holder 11 or change the location of a hanger.

In use the holder 11 is spread apart to allow the pipe P to be centered in the ribbed pipe support 14.

Insulation I is placed around the pipe P into each end of the shell 12 and against the sidewalls 15 of the ribbed support 14.

The shell 12 is closed over the insulation I and pipe P until the clamp 18 is engaged securing both the pipe P and insulation I. Release slot 21 is provided for easy opening of the clamp 18 if its position is to be moved or a hanger is to be replaced.

Thereafter a hanger C or S is put around the holder 11 thereby to support or suspend the insulated pipe.

The holder of my invention is particularly useful in the hanging and insulating of pipes in air conditioning and refrigeration systems so as not to break the insulation while holding the pipe securely in one easy step.

The holder also serves to seal the ends of the insulation I, not merely hold the pipe P. Prior art holders would leak condensation where meeting the hanger eventually forming ice under low temperature conditions.

The overall job appears neater and labor is saved. The pipe is secure but allowed to expand without restriction.

It should be obvious that changes, additions and omissions may be made in the details and arrangement of parts without departing from the scope of the invention as defined in the appended claims.

What is claimed is:

1. A holder for supporting a pipe having a layer of insulation extending around the outer surface thereof, a portion of said layer of insulation having axially spaced end faces, the portion of the pipe extending between the axially spaced end faces of said layer of insulation having no insulation thereon, a tubular shell for receiving said spaced end faces of the layer of insulation and said portion of said pipe, a support centered within said shell, said pipe support having an interior support for grasping said portion of said pipe and axially spaced transverse sidewalls for abutting against the spaced end faces of said layer of insulation, whereby the layer of insulation and exterior surface of the pipe are simultaneously grasped by said holder, to thereby eliminate condensation leaks.

2. The holder of claim 1 wherein said interior support has ribs for grasping said pipe.

3. The holder of claim 1 wherein said shell has a hinge lengthwise along an exterior of said shell and a lengthwise slit through said pipe support whereby said holder may be opened up like a clam shell to pass the pipe through said interior support and for abutting insulation against said transverse sidewalls.

4. The holder of claim 1 including a releasable clamp in said shell to lock said interior support in place against the pipe and the insulation against said pipe support transverse sidewalls.

5. The holder of claim 1 including an exterior circumferential recess about said shell for receipt of said hanger.

6. A holder for supporting a pipe having a layer of insulation extending around the outer surface thereof, a portion of said layer of insulation having axially spaced end faces, the portion of the pipe extending between the axially spaced end faces of said layer of insulation having no insulation thereon, a tubular shell for receiving said spaced end faces of the layer of insulation and said portion of said pipe, a pipe support centered within said shell, said pipe support having an interior support for grasping said portion of said pipe and axially spaced transverse sidewalls for abutting against the spaced end faces of said layer of insulation, said interior support having ribs for grasping said pipe, said shell having a hinge lengthwise along an exterior of said shell and a lengthwise split through said pipe support, whereby said holder may be opened up like a clam shell to pass the pipe through said interior support and for abutting the end faces against said transverse sidewalls, a releasable clamp in said shell to lock said interior support in place against the pipe and the spaced end faces of the layer of insulation against said pipe support transverse sidewalls, and an exterior circumferential recess about said shell for receipt of said hanger.

* * * * *